United States Patent
Marien

(10) Patent No.: US 9,510,192 B2
(45) Date of Patent: Nov. 29, 2016

(54) METHOD AND APPARATUS FOR SECURING A MOBILE APPLICATION

(71) Applicant: VASCO DATA SECURITY, INC., Oakbrook Terrace, IL (US)

(72) Inventor: Dirk Marien, Ranst (BE)

(73) Assignee: VASCO DATA SECURITY, INC., Oakbrook Terrace, IL (US)

( * ) Notice: Subject to any disclaimer, the term of this patent is extended or adjusted under 35 U.S.C. 154(b) by 0 days.

(21) Appl. No.: 14/580,438

(22) Filed: Dec. 23, 2014

(65) Prior Publication Data
US 2015/0189505 A1 Jul. 2, 2015

Related U.S. Application Data

(60) Provisional application No. 61/922,215, filed on Dec. 31, 2013.

(51) Int. Cl.
| | |
|---|---|
| *H04K 1/00* | (2006.01) |
| *H04W 12/04* | (2009.01) |
| *H04W 4/00* | (2009.01) |
| *H04L 29/06* | (2006.01) |
| *H04W 12/06* | (2009.01) |

(52) U.S. Cl.
CPC .......... *H04W 12/04* (2013.01); *H04L 63/0428* (2013.01); *H04L 63/0838* (2013.01); *H04L 63/0846* (2013.01); *H04L 63/0853* (2013.01); *H04W 4/008* (2013.01); *H04W 12/06* (2013.01)

(58) Field of Classification Search
CPC  H04W 12/04; H04W 4/008; H04L 63/0428; H04L 63/0853
USPC .......................................................... 380/270
See application file for complete search history.

(56) References Cited

U.S. PATENT DOCUMENTS

| | | | |
|---|---|---|---|
| 8,789,146 B2 | 7/2014 | Ehrensvard | |
| 8,943,311 B2 * | 1/2015 | Ronda | ............................ 713/156 |
| 9,104,853 B2 * | 8/2015 | Mathur | .................... G06F 21/35 |
| 2009/0048971 A1 * | 2/2009 | Hathaway | ............ G06Q 20/105 |
| | | | 705/41 |
| 2009/0143104 A1 * | 6/2009 | Loh | ........................ G06Q 20/32 |
| | | | 455/558 |

(Continued)

FOREIGN PATENT DOCUMENTS

| | | |
|---|---|---|
| WO | WO 2010/043974 | 4/2010 |
| WO | WO 2013/034681 | 3/2013 |

OTHER PUBLICATIONS

Pardis Pourghomi; Managing NFC Payment Applications through Cloud Computing; IEEE; Year:2012; p. 772-777.*

(Continued)

*Primary Examiner* — Monjour Rahim
(74) *Attorney, Agent, or Firm* — RatnerPrestia

(57) ABSTRACT

Methods, apparatus, and systems for securing a mobile application are disclosed. Users of the mobile application may be authenticated using a smartphone or other device including a Near-Field Communication (NFC) transfer device capable of NFC communication. An authentication device may be adapted to present itself to the NFC transfer device as an NFC tag and make a dynamic credential available to the NFC transfer device by including the dynamic credential in an NFC tag readable by the NFC transfer device using NFC mechanisms for reading data contents of NFC tags. An access device comprising the NFC transfer device may then provide the dynamic credential to an application server for verification.

22 Claims, 3 Drawing Sheets

(56) References Cited

U.S. PATENT DOCUMENTS

| | | | |
|---|---|---|---|
| 2010/0178868 A1* | 7/2010 | Charrat | G06Q 20/3278 455/41.1 |
| 2012/0023567 A1* | 1/2012 | Hammad | G06Q 20/12 726/9 |
| 2012/0167194 A1* | 6/2012 | Reese | G06F 21/83 726/9 |
| 2012/0265988 A1* | 10/2012 | Ehrensvard | G06F 21/35 713/165 |
| 2013/0343542 A1* | 12/2013 | Rosati | H04W 12/04 380/270 |
| 2014/0181955 A1* | 6/2014 | Rosati | G06F 21/44 726/18 |

OTHER PUBLICATIONS

International Search Report and Written Opinion for PCT/US2014/072102 mailed Mar. 5, 2015.

* cited by examiner

METHOD AND APPARATUS FOR SECURING A MOBILE APPLICATION

CROSS REFERENCE TO RELATED APPLICATIONS

This application claims priority to U.S. Provisional application Ser. No. 61/922,215 entitled A Method and Apparatus for Securing a Mobile Application, filed on Dec. 31, 2013, the contents of which are incorporated fully herein by reference.

FIELD OF THE INVENTION

The invention relates to securing remote access to computers and applications and remote transactions over computer networks. More specifically, the invention relates to methods and apparatus for authenticating users using a smartphone to access a remote application.

BACKGROUND OF THE INVENTION

As remote access of computer systems and applications grows in popularity, the number and variety of transactions which are accessed remotely over public networks such as the Internet has increased dramatically. This popularity has underlined a need for security; in particular: how to ensure that people who are remotely accessing an application are who they claim they are, how to ensure that transactions being conducted remotely are initiated by legitimate individuals, and how to ensure that transaction data has not been altered before being received at an application server.

Recently, the use of a smartphone, rather than a PC (Personal Computer), to access remote applications has become increasingly popular. This means that solutions are required to secure the interaction of users with remote applications while using their smartphones. Existing solution which originally have been developed to be used with a PC quite often are not very satisfactory for usage with a smartphone for a variety of reasons. Pure software solutions, like software applications generating dynamic passwords and signatures, are vulnerable to attacks since smartphones unfortunately, just like PCs, have become more and more the target of all kinds of malware. Hardware solutions like smart cards or USB tokens require a specific communication interface (smart card reader, USB port . . . ) that is often not supported by the smartphone. And the usage of other hardware solutions, like strong authentication tokens, that rely on the user to manually copy data (like one-time passwords) to be exchanged may often be perceived as too cumbersome by users who have their hands already literally full with the smartphone itself.

What is needed is a secure yet convenient solution to secure the interaction between a user and a remote application using a smartphone.

DISCLOSURE OF THE INVENTION

The invention is based on an insight of the inventors that most smartphones nowadays support NFC (Near Field Communication) technology to communicate and exchange data with other devices.

NFC can for example by used to communicate with contactless smart cards. However, the operating system of a number of smartphones don't give access to a low level API to directly exchange commands and responses over NFC with an NFC tag. Instead they may only support some limited high level services over NFC.

It is another insight of the inventors that most smartphones support the automatic read-out of NFC memory tags.

One aspect of the invention provides an authentication device for securing interaction of a user with a computer based application.

In some embodiments the authentication device may comprise a memory component adapted to store a secret key; a data processing component adapted to generate a dynamic credential by cryptographically combining said secret key with the value of a dynamic variable; a Near-Field Communication (NFC) interface to couple the authentication device to an NFC transfer device; whereby the authentication device may be adapted to: present itself to said NFC transfer device as an NFC tag; make said generated dynamic credential available to said NFC transfer device by including said dynamic credential in first data contents of said NFC tag that can be read by said NFC transfer device using NFC mechanisms for reading data contents of NFC tags.

In some embodiments the authentication device may comprise an authentication device of any of the previously described embodiments that may be further adapted to present itself as an NFC Forum-compliant tag of Type 1, Type 2, Type 3 or Type 4 and to make said generated dynamic credential available to said NFC transfer device by including said dynamic credential in an NFC Data Exchange Format (NDEF) record of an NDEF message of an NDEF file of the authentication device for said NFC transfer device to read using NFC mechanisms for reading NDEF messages from NFC Forum-compliant tags.

In some embodiments the authentication device may comprise an authentication device of any of the previously described embodiments that may further comprise a clock and wherein said dynamic variable may be based on a time value provided by said clock.

In some embodiments the authentication device may comprise an authentication device of any of the previously described embodiments whereby said dynamic variable may be based on an event related value that is stored in said memory component and that may be updated by the authentication device each time a specific event occurs. In some embodiments said specific event may coincide with said generation of said dynamic credential. In some embodiments said event related value may comprise a counter that may be monotonically incremented or decremented by said authentication each time said specific event occurs.

In some embodiments the authentication device may comprise an authentication device of any of the previously described embodiments wherein said cryptographically combining said secret key with the value of said dynamic variable may comprise applying a symmetric cryptographic algorithm to said dynamic variable whereby said symmetric cryptographic algorithm is parameterized with said secret key and whereby said secret key is shared with an entity for verifying said generated dynamic credential.

In some embodiments the authentication device may comprise an authentication device of any of the previously described embodiments that may be further adapted to store a user identifier and to make said user identifier available to said NFC transfer device by including said dynamic credential in data contents of said NFC tag that can be read by said NFC transfer device using NFC mechanisms for reading data contents of NFC tags.

In some embodiments the authentication device may comprise an authentication device of any of the previously described embodiments that may further comprise a user input interface for capturing an input from said user and that may be further adapted to require a specific input from said user as a condition for said generating said dynamic credential and/or for said making said generated dynamic credential available to said NFC transfer device. In some embodiments said user input interface may comprise an activation button and said specific input may comprise the user pressing said activation button. In some embodiments the authentication device may be further adapted to be activated by the user by said user input interface and the authentication device may present itself to said NFC transfer device as an NFC tag only after the user has activated the device by using said user input interface.

In some embodiments the authentication device may comprise an authentication device of any of the previously described embodiments that may be further adapted to be permanently or semi-permanently fixed to said NFC transfer device. In some embodiments the authentication device may further comprise an adhesive component for attaching the device to said NFC transfer device. In some embodiments the authentication device may be comprised in a protective shell or a protective cover of an access device comprising said NFC transfer device.

In some embodiments the authentication device may comprise an authentication device of any of the previously described embodiments wherein said dynamic variable may be based on external data and wherein the device may be further adapted to receive said external data from said NFC transfer device by extracting the external data from second data contents of said NFC tag that have been updated by said NFC transfer device using NFC mechanisms for updating data contents of NFC tags. In some embodiments the authentication device may further comprise a user input interface and a user output interface, wherein said external data may comprise transaction data and wherein the device may be further adapted to present said transaction data to the user and to capture with said input interface an approval or a rejection by said user of said presented transaction data and to generate said dynamic credential and/or for make said generated dynamic credential available to said NFC transfer device only if said user approved said presented transaction data. In some embodiments said user input interface may comprise an approval button for capturing said approval and a rejection button for capturing said rejection. In some embodiments the authentication device may be further adapted to not present itself to said NFC transfer device as an NFC tag for a certain period after having received said external data from said NFC transfer device and to present itself again to said NFC transfer device only after said user approved or rejected said presented transaction data.

In some embodiments the authentication device may comprise an authentication device of any of the previously described embodiments that may be further adapted to: receive a password value from said NFC transfer device by extracting said password value from third data contents of said NFC tag that have been updated by said NFC transfer device using NFC mechanisms for updating data contents of NFC tags; verify the correctness of said received password value (e.g. by comparing the received password value to a password reference value that may be stored in said memory component); and generate said dynamic credential and/or make said generated dynamic credential available to said NFC transfer device only if the device has received said password value and has verified the correctness of said received password value.

Another aspect of the invention provides a system for securing interaction of a user with a computer based application. In some embodiments the system may comprise any of the authentication devices of the previously described embodiments. In some embodiments the system may comprise: an authentication device for generating a dynamic credential; an application server for hosting a server part of said application and verifying said dynamic credential generated by said authentication device; and an access device for allowing said user to access said computer based application, the access device connected to the application server by a computer network and adapted to obtain said dynamic credential from said authentication device and to forward said obtained dynamic credential to said application server for verification; whereby: said access device may comprise an NFC transfer device; and said authentication device may comprise a memory component adapted to store a secret key, a data processing component adapted to generate said dynamic credential by cryptographically combining said secret key with a first value of a first dynamic variable, and a Near-Field Communication (NFC) interface to couple the authentication device to said NFC transfer device; and whereby: said authentication device may be adapted to present itself to said NFC transfer device as an NFC tag and make said generated dynamic credential available to said NFC transfer device by including said dynamic credential in first data contents of said NFC tag that can be read by said NFC transfer device using NFC mechanisms for reading data contents of NFC tags; said access device may obtain said dynamic credential by extracting the dynamic credential from said data contents of said NFC tag that the NFC transfer device may read using said NFC mechanisms for reading data contents of NFC tags; and said application server may be adapted to receive said dynamic credential generated by said authentication device and obtained and forwarded by said access device, and to verify said received dynamic variable using a cryptographic algorithm with a second value of a second dynamic variable.

In some embodiments the system may comprise any system of the previously described embodiments whereby said cryptographically combining said secret key with said first value of said first dynamic variable may comprise performing a symmetric cryptographic algorithm on said first value of said first dynamic variable whereby said symmetric cryptographic algorithm may be parameterized with said secret key and whereby said secret key may be shared between said authentication device and said application server and whereby said application server may use a server copy of said secret key to verify said dynamic credential.

In some embodiments the system may comprise any system of the previously described embodiments whereby said authentication device and said access device may share a binding secret; said access device may be further adapted to communicate to said authentication device a binding value that the access device may have derived from said binding secret, whereby the access device may communicate the binding value to the authentication device by said NFC transfer device updating second data contents of said NFC tag using NFC mechanisms for updating data contents of NFC tags; and said authentication device may be further adapted to: receive said binding value from said access device by extracting said binding value from said second data contents of said NFC tag that have been updated by said NFC transfer device using said NFC mechanisms for updating data contents of NFC tags; verify said received binding value using said binding secret; and generate said dynamic credential and/or make said generated dynamic credential available to said NFC transfer device only if the authentication device has successfully verified the correctness of said received binding value.

Yet another aspect of the invention provides a method for securing interaction of a user with a computer based application. In some embodiments the method may be used with any of the authentication devices or any of the systems of the previously described embodiments. In some embodiments the method may comprise the steps of: at an authentication device that comprises a Near-Field Communication (NFC) interface to couple the authentication device to an NFC transfer device generating a dynamic credential by cryptographically combining a first value of a first dynamic variable with a secret key that is stored in said authentication device and shared with an application server that is hosting a server part of said application; the authentication device presenting itself to said NFC transfer device as an NFC tag; at the authentication device making said generated dynamic credential available to said NFC transfer device by including said dynamic credential in first data contents of said NFC tag that can be read by said NFC transfer device using NFC mechanisms for reading data contents of NFC tags; allowing said user to access said computer based application using an access device that comprises said NFC transfer and that is connected to the application server by a computer network; at said access device obtaining said dynamic credential by extracting the dynamic credential from said data contents of said NFC tag that the NFC transfer device reads using said NFC mechanisms for reading data contents of NFC tags; at said access device forwarding said dynamic credential to said application server; at said application server receiving said dynamic credential that is generated by said authentication device and obtained by said access device; and at said application server verifying said received dynamic credential.

In some embodiments of the invention an authentication device is provided that presents itself to the smartphone as a standard passive NFC memory tag. In some embodiments the smartphone may be an NFC Forum-compliant device. In some embodiments the authentication device may comprise or present itself as an NFC Forum compliant tag. In some embodiments the NFC Reader/Writer Mode may be used. In some embodiments the smartphone may take on the NFC Reader/Writer role.

In some embodiments aspects of the communication between the smartphone and the authentication device may be defined in at least some of the NFC Forum Technical Specifications, such as for example the NFC Digital Protocol Technical Specification, or the NFC Activity Technical Specification, and other specifications and standards such as for example ISO/IEC (International Organization for Standardization/International Electrotechnical Commission) 18092, ISO/IEC 18000-3, ISO/IEC 14443 (type A or type B), and Japanese Industry Standard (JIS) X 6319-4. Other aspects of the way that the authentication device presents itself to the smartphone (or other NFC transfer device) and of the data exchange between the authentication device and the smartphone may be defined in at least some of the NFC Forum Technical Specifications, such as for example the NFC Data Exchange Format (NDEF) Technical Specifications, the NFC Forum Tag Type Technical Specifications (such as the NFC Forum Type 1/2/3/4 Tag Operation Specifications) and the Record Type Definition Technical Specifications (such as the NFC Record Type Definition (RTD) Technical Specification, the NFC Uniform Resource Identifiers (URI) RTD Technical Specification, and the NFC Smart Poster RTD Technical Specification). In some embodiments the authentication device may present itself as a standard NFC Type 1 Tag. In some embodiments the authentication device may present itself as a standard NFC Type 2 Tag. In some embodiments the authentication device may present itself as a standard NFC Type 3 Tag. In some embodiments the authentication device may present itself as a standard NFC Type 4 Tag.

In this description the terminology NFC transfer device may refer to an NFC Forum Device or other similar device that may operate in the NFC Reader/Writer Modus Operandi as defined in the applicable NFC specifications. The terminology NFC tag or NFC memory tag (or simply tag or memory tag) may refer to an NFC Tag as defined in the NFC Digital Protocol Technical Specification and the NFC Forum Tag Type Technical Specifications i.e. a contactless tag or (smart) card supporting NDEF over Passive Communication wherein Passive Communication is a communication mode in which one device (the NFC transfer device) generates an RF field (Radio Frequency field; RF field=magnetic field) and sends commands to a second device (the NFC Tag), and wherein to respond, this second device uses load modulation (i.e., it does not generate an RF field but it draws more or less power from the RF field).

The authentication device (which may be further referred to as an NFC token device or NFC token) may be adapted to generate a one-time password (which may be further referred to as OTP), to present itself as an NFC tag and to populate the contents of the NFC memory tag with the generated one-time password. For example in some embodiments the contents of the memory tag may comprise an NDEF message comprising an NDEF record comprising the generated OTP. The contents of the memory tag (which may comprise the OTP) may be read by an NFC transfer device (such as a smartphone) by the standard protocols for reading the contents of an NFC memory tag. In some embodiments the NFC token may generate the one-time password and populate the contents of the tag with the generated OTP when the NFC token is activated by bringing it into the NFC field of the smartphone. In some embodiments the NFC token may generate the one-time password and populate the contents of the tag on the fly upon receiving a read command from the NFC transfer device to read the memory tag contents. For example in some embodiments the NFC token may be an NFC Type 4 tag and the NFC token may be adapted to generate an OTP, generate an NDEF message comprising the generated OTP and populate an NDEF file, upon receiving a ReadBinary command to read the NDEF file and before responding with the contents of the populated NDEF file. In some embodiments the NFC token generates a new one-time password and populates the contents of the tag with the new OTP after the current contents of the tag have been read by the smartphone.

OTP Generation

In some embodiments the NFC token may comprise one or more memory components and may be adapted to store a secret key in the one or more memory components, and the NFC token may further comprise one or more data processing components and may be further adapted to generate the OTP by cryptographically combining the stored secret key with a dynamic variable. In some embodiments the NFC token may comprise a clock for generating a time value which the NFC token may use to determine the value of the dynamic variable for generating a time-based OTP. In other embodiments the NFC token may store and maintain in memory an event related value that it updates upon specific events and the NFC token may use this event related value to determine the value of the dynamic variable for generating an event-based OTP. For example in some embodiments the NFC token may update the event related value each time that the NFC token generates a one-time password. In some embodiments the event related value may be a counter and updating the event related value may comprise for example incrementing (or decrementing) the counter. In some embodiments updating the event related value may comprise the NFC token replacing the current value of the event related value by a new value that the NFC token may calculate from the current value of the event related value. In some embodiments the NFC token may calculate the new value of the event related value for example by applying a hashing function to the current value of the event related value.

Integration with an Application

In some embodiments the smartphone and the NFC token may be configured such that when the NFC token is brought in the NFC field of the smartphone, the NFC token may be automatically activated and the smartphone may detect the presence of the NFC token (which may present itself as an ordinary standard passive NFC tag) whereupon the smartphone may read the contents of the tag containing the OTP. Upon reading the contents of the tag, the smartphone may automatically launch an application (such as a browser or for example a mobile banking application) associated with the tag and pass the contents of the tag to the application. In some embodiments the contents of the tag may, in addition to an OTP, also comprise a data element identifying a user associated with the NFC token. In such cases the contents of the tag may automatically provide for example User ID (user identifier) and dynamic password information to the application associated with the tag that is automatically launched by the smartphone thus providing a convenient and secure application launch and login experience to the user. For example in some embodiments the contents of the tag may comprise an NDEF message and the NDEF message may comprise an NDEF record of the URI type which may comprise a URI that is parameterized with a User ID and an OTP. Upon reading the NDEF message, a smartphone may launch a browser application and pass the URI (which is parameterized with the User ID and OTP) to the browser upon which the browser passes the User ID and OTP as parameters of the URI to the application server indicated by the URI thus enabling the user to be automatically logged in into the application indicated by the URI. For example in some embodiments the NFC reader device reading the contents of the tag may select an application or an app based on the Record Type of an NDEF record in an NDEF message that it reads from the tag and pass the contents of the record (which may for example comprise an OTP and/or User ID) to that application or app. In some embodiments the Record Type may be an External Type. The application or app may for example comprise a mobile banking app.

Explicit Activation of the NFC Token by the User

In some embodiments the NFC token doesn't make an OTP available to an NFC transfer device by default, but only after an explicit action of the user. For example in some embodiments the NFC token may comprise a user input interface (such as a button) and the NFC token may be adapted to make an OTP available only when the user has indicated by using the user input interface (e.g. by pressing the button) that the OTP should be made available.

In some embodiments the NFC token may be adapted to make a generated OTP available in an NDEF record of an NDEF file and the token may be adapted to automatically generate an OTP and update the NDEF file with the new OTP value when a user has used the user input interface to instruct the NFC token to do so.

In some embodiments the NFC token by default does not present an NFC tag to the smartphone even when it is brought in the NFC field of the smartphone. In some embodiments the NFC token requires an explicit physical action of the user to prompt the NFC token to present itself as an NFC tag to the smartphone. For example in some embodiments the NFC token may comprise a user input interface and the NFC token may be adapted to present itself as an NFC tag only when the user has indicated by using the user input interface that it should do so. For example in some embodiments the NFC token may comprise an activation button and the NFC token may be adapted to present itself as an NFC tag to the smartphone after the user has pressed the activation button. In some embodiments the NFC token may be adapted such that the NFC antenna of the NFC token may be electrically disconnected from the other components of the NFC token and the antenna may be connected to the other components of the NFC token when the user pushes the activation button upon which the NFC token may become perceivable to the smartphone as an NFC tag. This has on the one hand the advantage that the contents of the NFC tag (which may comprise an OTP and User ID) only become accessible for read out when the user explicitly pushes the activation button thus preventing surreptitious reading out of the OTP and user id by some rogue application without the user being aware of it. This also has the additional advantage that the user does not need to move the NFC token out and back into the NFC field to activate the NFC token, let the NFC token generate a new OTP and force the smartphone to read the contents of the NFC tag again. This means that the user can keep the NFC token permanently attached to the smartphone such that the user doesn't need to keep track of the whereabouts of the NFC token. Yet another advantage of the activation button is that it may allow the user to launch an application and to securely login into the application with just one push on the activation button of the NFC token.

Signing Transaction Data

In some embodiments the NFC token may be adapted to generate an OTP or a signature by cryptographically combining a secret key stored in the NFC token with a dynamic variable that is based on external data that the NFC token may receive from the smartphone. The terminology dynamic credential as used in this description may refer to an OTP or a signature that is generated by cryptographically combining a secret key with a dynamic variable that is based on external data may also be referred. The external data may for example comprise a challenge (which may be provided by an application) or transaction data. In some embodiments the smartphone (or other device comprising an NFC transfer device capable of reading and/or writing data/information using NFC) may transfer these external data to the NFC token by using the standard mechanism for updating the contents of an NFC memory tag. For example the smartphone, or other device which may comprise an NFC transfer device, may update an NDEF record in an NDEF file of the NFC token with the external data. In some embodiments the NFC token may generate for example the response to the received challenge or the signature over the transaction data after receiving the external data comprising for example the challenge or the transaction data. In some embodiments the NFC token may be adapted to update the contents of the memory tag with the generated response or signature. In some embodiments the NFC token disconnects and reconnects the memory tag that it presents to the smartphone to prompt the smartphone to read the updated contents of the memory tag. I.e. in some embodiments the NFC token may be adapted to stop presenting itself during a certain period as an NFC tag after it has received the external data. After that period the NFC token may again present itself as an NFC tag the NDEF file of which the NFC token may have updated with a signature that the NFC token has in the meantime generated over the external data. In some embodiments the period that the NFC token is thus not visible to the NFC transfer device or smartphone as an NFC tag may be less than 2 seconds. In some embodiments this period of time is less than 1 second. In some embodiments this period of time is less than 0.5 seconds. In some embodiments this period of time is less than 0.1 seconds. In some embodiments this period of time is the minimum period of time that must elapse between the removal and the (re)insertion of an NFC tag in the near field of an NFC transfer device to guarantee that the NFC transfer device will notice that an NFC tag has been removed and then presented again.

In some embodiments the NFC token may be adapted to put the generated response or signature in another part of the tag contents than an OTP that is not based on external data. In some embodiments the smartphone may include a session id in the external data that it writes to the NFC token and the NFC token may include this session id along with the generated response or signature with which it updates the memory tag. In some embodiments the NFC token may comprise the generated response or signature, and optionally also the session id or a user id or another identifying data element, in a memory tag that is associated with a specific helper application that is adapted to forward data comprised in that memory tag (e.g., the generated response or signature and optionally a session id, user id or other identifying data element) to a verification server associated with the mobile application being accessed by the user.

In some embodiments a first application or app on the NFC transfer device or smartphone may update the memory tag with external data. The NFC token may use these external data to generate a dynamic credential and update the contents of the memory tag (e.g. by updating an NDEF record in an NDEF message in an NDEF file of the NFC token) with the generated dynamic credential. The NFC transfer device or smartphone may then read the updated contents and pass the updated contents that it has read to a second application or app on the NFC transfer device that the NFC transfer device may have selected on the basis of information in the updated contents that is has read (such as for example the NDEF type of an NDEF record in the NDEF message).

In some embodiments the NFC token may comprise a signature button and may require the user to push the signature button to generate the signature and/or make the signature available to be read by the smartphone or the NFC transfer device. In some embodiments the signature button may be the same as the activation button for generating an OTP. In some embodiments the signature button may be a different button than the activation button.

In some embodiments the NFC token may comprise a user output interface (such as a display) and the NFC token may be adapted to present the external data to be signed to the user and wait for the user to approve the presented external data before generating the signature and/or making the signature available to be read by the smartphone or the NFC transfer device. In some embodiments the NFC token may be adapted to capture the user's approval of the external data by the user input interface. In some embodiments the NFC token may be adapted to capture the user's rejection of the external data by the user input interface, and the NFC token may be adapted to communicate the user's rejection by updating the contents of the memory tag accordingly (e.g. by including an indication of the rejection in an NDEF record of an NDEF message of an NDEF file of the NFC token). In some embodiments the NFC token may have an activation button for the user to indicate approval and a rejection button for the user to indicate rejection.

PIN Entry

In some embodiments the NFC token may be adapted to verify a Personal Identification Number (PIN) and/or a password and may require that a correct PIN and/or password is provided to generate for example a signature or a response to external data. In some embodiments the user may enter the PIN and/or password of the NFC token on the smartphone and the smartphone may provide the PIN and/or password to the NFC token for example together with or as part of the external data. For example in some embodiments the PIN or password to be verified may be communicated by an NFC transfer device (e.g., NFC transfer device within a smartphone) to the NFC token by the NFC transfer device updating an NDEF record in an NDEF file of the NFC token. In some embodiments the NFC token may comprise one or more memory components and may be adapted to store a PIN reference value and/or a password reference value in the one or more memory components and the NFC token may be adapted to verify a PIN and/or a password that it has received from for example the smartphone by comparing the received PIN and/or password with the stored PIN reference value and/or password reference value. In some embodiments the PIN may comprise a string of decimal digits. In some embodiments the password may comprise a string of alphanumerical characters.

In some embodiments the NFC token may be adapted to verify a biometric measurement of the legitimate user and may require that a correct biometric of the legitimate user associated with the NFC token is provided to generate for example a signature or a response to external data. In some embodiments the smartphone (or other device comprising an NFC transfer device) may capture a biometric measurement of the user (e.g. by using a biometric sensor on the smartphone) and the smartphone may provide the biometric measurement to the NFC token for example together with or as part of the external data. In some embodiments the NFC token may comprise one or more memory components and may be adapted to store biometric reference data in the one or more memory components and the NFC token may be adapted to verify a biometric measurement that it has received from for example the smartphone by comparing the received biometric measurement with the stored biometric reference data.

Binding the NFC Token to an NFC Transfer Device

In some embodiments the NFC token may be bound to a particular NFC transfer device. In some embodiments the NFC reading device and the NFC token may be bound the first time the NFC token is used with the NFC transfer device. In some embodiments the binding is done using a binding secret that is shared by the NFC token and the NFC reading device. In some embodiments the NFC transfer device may receive the value of the binding secret from the user. In some embodiments the NFC reading device may receive the value of the binding secret once (e.g. the first time the NFC token is used with that NFC transfer device) and may store the value of the binding secret for future use. In some embodiments the NFC token may require that a correct value for the binding secret is provided to the NFC token (e.g. in the same way that a PIN or password value may be provided as described above) as a condition for generating a dynamic credential such as a signature or an OTP, and the NFC token may verify whether the binding secret is correct. In some embodiments the NFC reading device may use the binding secret with a cryptographic algorithm to generate a cryptographic binding value and the NFC transfer device may provide the generated binding value to the NFC token (e.g. in the same way that a PIN or password value may be provided as described above) and the NFC token may verify whether the binding value is cryptographically correct and the NFC token may use the cryptographic correctness of the binding value as a condition to generate a dynamic credential.

Form Factor

In some embodiments the NFC token may have a form factor that allows the NFC token be easily fixed in a permanent or semi-permanent way to an access device comprising an NFC reading device (e.g., smartphone) such that the NFC token remains fixed to the access device until explicit action is taken by a user to detach the NFC token (or an object comprising the NFC token) from the access device. For example in some embodiments the NFC token may comprise an adhesive part that allows the NFC token to be stuck or glued to the access device. In some embodiments the NFC token may have a thickness of maximally 2 mm. In some embodiments the NFC token may have a thickness of maximally 1 mm. In some embodiments the NFC token may have a width of maximally 54 mm and a length of maximally 86 mm. In some embodiments the NFC token may have a width and a length of maximally 3 cm. In some embodiments the NFC token may be comprised in a sticker that may be attached to a smartphone. In some embodiments the NFC token may be comprised in for example a shell or protective cover of a smartphone. In some embodiments the NFC token may be portable. In some embodiments the NFC may have a weight of less than 10 gram.

In some embodiments the NFC token may comprise an autonomous electrical energy source for powering the NFC token for example when it can't get (sufficient) electrical power from the NFC field of a smartphone or other device comprising an NFC transfer device. In some embodiments the autonomous electrical energy source may be rechargeable. In some embodiments the NFC token may be adapted to recharge the autonomous electrical energy source using energy captured from the NFC field of the smartphone or other device comprising an NFC transfer device. In some embodiments the NFC token may comprise a battery. In some embodiments the battery may be rechargeable. In some embodiments the NFC token may be adapted to recharge the battery using energy captured from the NFC field of the smartphone or other device comprising an NFC transfer device. In some embodiments the NFC token may comprise a capacitor for providing electrical energy to the electronics of the NFC token. In some embodiments the NFC token may be adapted to recharge the capacitor using energy captured from the NFC field of the smartphone or other device comprising an NFC transfer device.

BRIEF DESCRIPTION OF THE DRAWINGS

The foregoing and other features and advantages of the invention will be apparent from the following, more particular description of embodiments of the invention, as illustrated in the accompanying drawings.

DETAILED DESCRIPTION

Some implementations of the present invention are discussed below. While specific implementations are discussed, it should be understood that this is done for illustration purposes only. A person skilled in the relevant art will recognize that other components and configurations may be used without parting from the spirit and scope of the invention.

Figure 1:
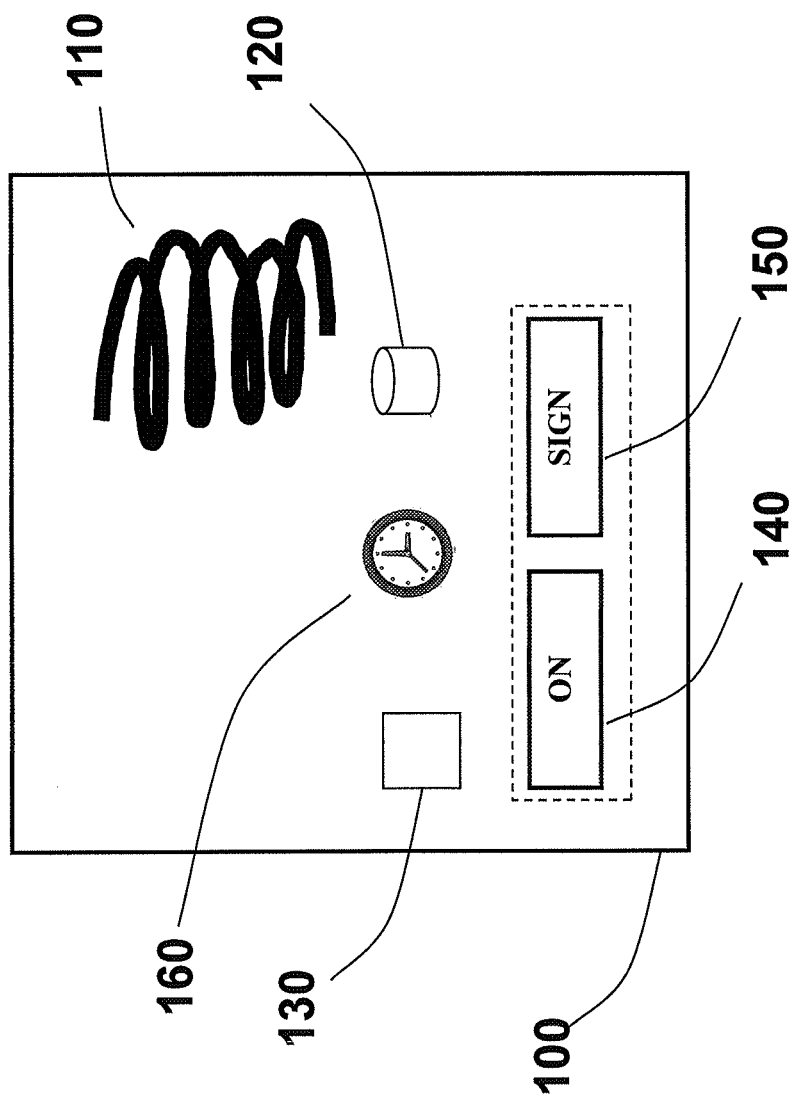
FIG. 1 schematically illustrates an exemplary apparatus according to an aspect of the invention.

FIG. 1 schematically illustrates an exemplary apparatus (100) of the invention according to an aspect of the invention. In some embodiments the apparatus (100) may comprise any of the authentication devices and/or NFC tokens described elsewhere in this description.

The illustrated apparatus comprises: an NFC antenna/interface (110), one or more memory components (120) for storing a secret key and for storing (at least temporarily) the contents of an NFC memory tag, one or more data processing components (130), an activation button (140), and a signature button (150). In some embodiments the apparatus may be adapted to generate an OTP and/or a signature or response to external data and to function as an NFC token described above.

In some embodiments the apparatus may be adapted to present itself as an NFC memory tag to a smartphone (or other device comprising an NFC transfer device). In some embodiments the apparatus may be adapted to generate a one-time password using the secret key stored in the one or more memory components and the apparatus may be adapted to populate or update the contents of the memory tag such that it includes the generated one-time password. In some embodiments the apparatus is adapted to enable the read-out of the contents of the memory tag comprising the one-time password using a standard NFC memory tag read operation.

In some embodiments the one or more data processing components may be adapted to generate the one-time password. In some embodiments the one or more data processing components may be adapted to perform cryptographic calculations parameterized with the secret key and using a dynamic variable for generating the one-time password. In some embodiments the cryptographic calculations may comprise for example performing a symmetric cryptographic algorithm parameterized with the secret key and using the dynamic variable. In some embodiments this symmetric cryptographic algorithm may comprise a symmetric encryption/decryption algorithm such as AES (Advanced Encryption Standard) or may comprise a keyed hashing algorithm such as HMAC (Hash-based Message Authentication Code).

In some embodiments the apparatus may comprise a clock (160) for providing a time value which the NFC token may use to generate a time-based OTP.

Figure 2:
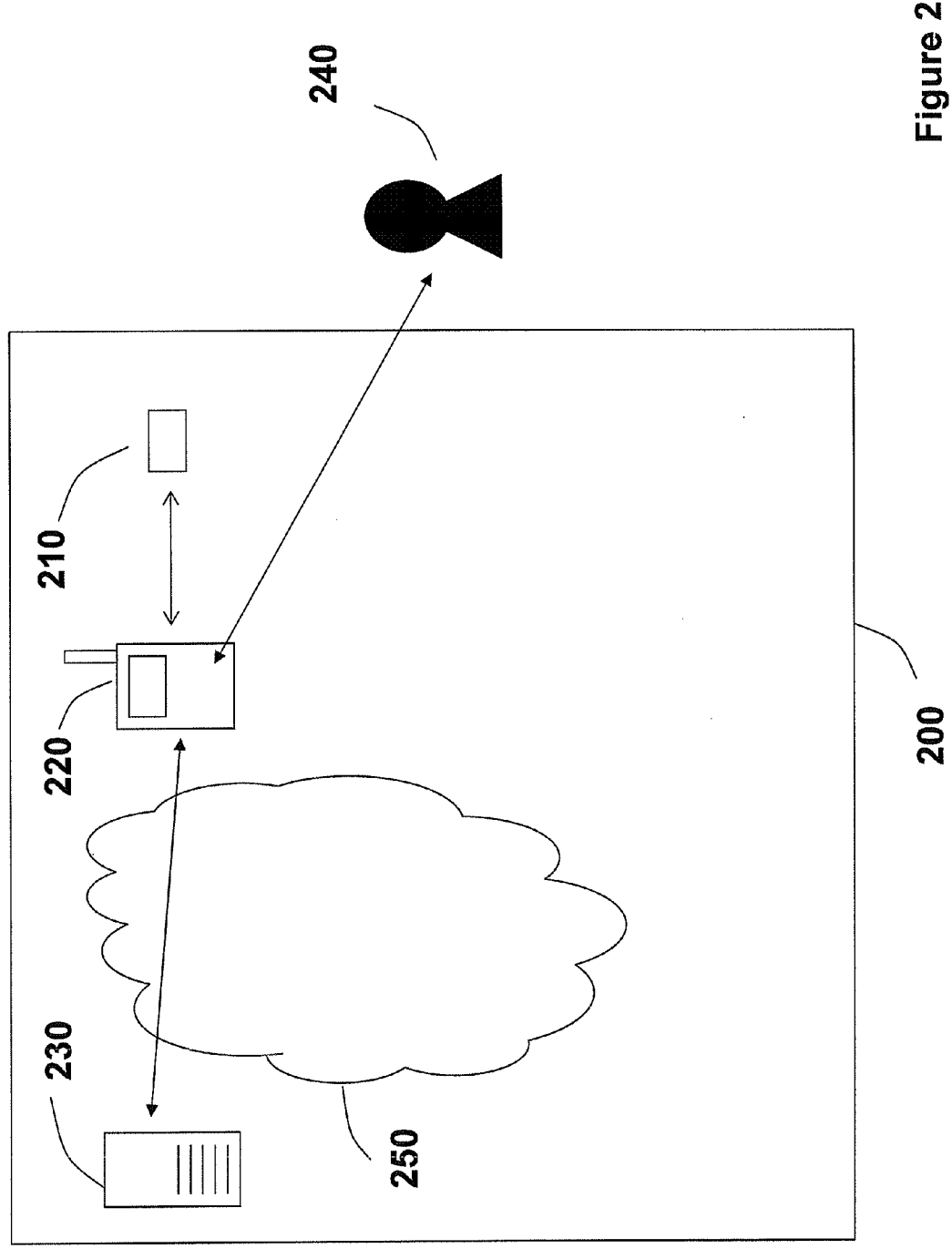
FIG. 2 schematically illustrates an exemplary system according to an aspect of the invention.

FIG. 2 schematically illustrates an exemplary system (200) according to an aspect of the invention. In some embodiments the system may comprise: an NFC token (210), a client device (220), and an application server (230).

In some embodiments the NFC token (210) may comprise any of the NFC tokens described elsewhere in this description.

In some embodiments the client device (220) may comprise a personal telecommunication device. In some embodiments the client device may comprise a smartphone (or other device comprising an NFC transfer device such as a tablet). In some embodiments the client application may be adapted to be operated by and to interface with a user (240). In some embodiments the client device may comprise a user output interface (such as a display) for presenting information to the user. In some embodiments the client device may comprise a user input interface (such as a keyboard or touch screen) to receive inputs or information from the user. In some embodiments the client device may be adapted to run a client application or a client app that the user may use to interact with an application e.g. by using the user input interface and the user output interface of the client device. In some embodiments the client application of client app may comprise a web browser to interact with a web-based application.

In some embodiments the application server (230) may comprise one or more computers. In some embodiments the application server may be adapted to host a server part of the application. The application may for example comprise a web banking application. In some embodiments the client device and the application server may be connected over a computer network (250) and/or a telecommunications network (250) such as for example the internet and/or a wireless data and/or telephone network.

Figure 3:
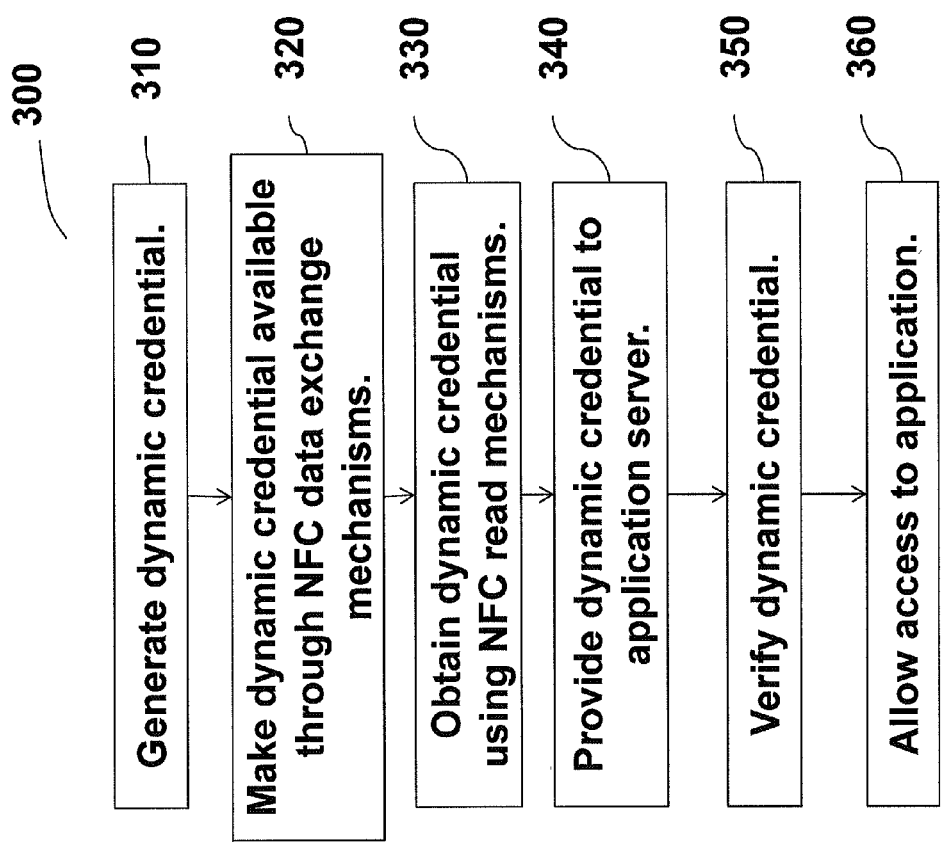
FIG. 3 is a flow chart illustrating steps of a method for securing interaction of a user with an application in accordance with aspects of the invention.

FIG. 3 depicts a flow chart 300 of steps for securing interaction of a user with a computer based application in accordance with an aspect of the invention.

At step 310, a dynamic credential is generated by an authentication device. The dynamic credential may be generated by authentication device 100. The authentication device includes a Near-Field Communication (NFC) interface to couple the authentication device to an NFC transfer device (e.g., of an access device such as client device 220). The authentication device 100 may generate the dynamic credential (e.g., using data processing component 130) by cryptographically combining a first value of a first dynamic variable with a secret key that is stored in the authentication device 100 (e.g., in memory 120). The secret key in the authentication device 100 may be shared with an application server (e.g., application server 230) that hosts a server part of the computer based application. In an embodiment, the authentication device 100 presents itself to the NFC transfer device as an NFC tag.

At step 320, the dynamic credential is made available by the authentication device to an NFC transfer device. The NFC transfer device may be a device capable of communication via NFC (e.g., client device 220/smartphone/tablet/ reader device or a component within such a device). The authentication device may make the dynamic credential generated (e.g., at step 310) available to the NFC transfer device by including the dynamic credential in first data contents of the NFC tag that can be read by the NFC transfer device using NFC mechanisms for reading data contents of NFC tags.

At step 330, an access device obtains the dynamic credential. The access device may be a device such as a smartphone that comprises the NFC transfer device. The access device may be connected to the application server that hosts the server part of the computer based application by a computer network. The access device may obtain the dynamic credential by extracting the dynamic credential from the data contents of the NFC tag that the NFC transfer device reads using the NFC mechanisms for reading data contents of NFC tags.

At step 340, the access device forwards the dynamic credential to the application server and the application server receives the dynamic credential, which was generated by the authentication device and obtained by the access device.

At step 350, the application server verifies the received dynamic credential. The application server may be configured to verify the dynamic credential for example by determining the value of the dynamic variable used to create the dynamic credential and by using the secret key that is shared with the authentication device e.g. to generate a reference value that may then be compared to the received dynamic credential.

At step 360, a user is allowed to access the computer based application using the access device. The user may be allowed to access the computer based application responsive to the application server verifying the received dynamic credential.

A number of implementations have been described. Nevertheless, it will be understood that various modifications may be made. For example, elements of one or more implementations may be combined, deleted, modified, or supplemented to form further implementations. Accordingly, other implementations are within the scope of the appended claims. In addition, while a particular feature may have been disclosed with respect to only one of several implementations, such feature may be combined with one or more other features of the other implementations as may be desired and advantageous for any given or particular application. While various embodiments have been described above, it should be understood that they have been presented by way of example only, and not limitation. In particular, it is, of course, not possible to describe every conceivable combination of components or methodologies for purposes of describing the claimed subject matter, but one of ordinary skill in the art may recognize that many further combinations and permutations are possible. Thus, the breadth and scope of the teachings herein should not be limited by any of the above described exemplary embodiments but should be defined only in accordance with the following claims and their equivalents.

The invention claimed is:

1. An authentication device for securing interaction of a user with a computer based application comprising:
   a memory component adapted to store a secret key;
   a data processing component adapted to generate a dynamic credential by cryptographically combining said secret key with the value of a dynamic variable;
   a Near-Field Communication (NFC) interface to couple the authentication device to an NFC transfer device; and
   a user input interface configured to capture an input from said user;
   the authentication device adapted to:
   present itself to said NFC transfer device as an NFC tag;
   make said generated dynamic credential available to said NFC transfer device by including said dynamic credential in first data contents of said NFC tag that can be read by said NFC transfer device using NFC mechanisms for reading data contents of NFC tags; and
   require a specific input from said user through the user input interface as a condition for at least one of said authentication device presenting itself to said NFC transfer device as an NFC tag or said data processing component generating said dynamic credential or said authentication device making said generated dynamic credential available to said NFC transfer device.

2. The device of claim 1 further adapted to present itself as at least one of an NFC Forum-compliant tag of Type 1, Type 2, Type 3 or Type 4 and to make said generated dynamic credential available to said NFC transfer device by including said dynamic credential in an NFC Data Exchange Format (NDEF) record of an NDEF message of an NDEF file of the authentication device for said NFC transfer device to read using NFC mechanisms for reading NDEF messages from NFC Forum-compliant tags.

3. The device of claim 1 further comprising a clock and wherein said dynamic variable is based on a time value provided by said clock.

4. The device of claim 1 wherein said dynamic variable is based on an event related value that is stored in said memory component and that is updated by the authentication device each time a specific event occurs.

5. The device of claim 4 wherein said specific event coincides with said generation of said dynamic credential.

6. The device of claim 4 wherein said event related value comprises a counter that is monotonically incremented or decremented by said authentication each time said specific event occurs.

7. The device of claim 1 wherein said cryptographically combining said secret key with the value of said dynamic variable comprises applying a symmetric cryptographic algorithm to said dynamic variable whereby said symmetric cryptographic algorithm is parameterized with said secret key and whereby said secret key is shared with an entity for verifying said generated dynamic credential.

8. The device of claim 1 further adapted to store a user identifier and to make said user identifier available to said NFC transfer device by including said dynamic credential in data contents of said NFC tag that can be read by said NFC transfer device using NFC mechanisms for reading data contents of NFC tags.

9. The device of claim 1 wherein said user input interface comprises an activation button and wherein said specific input comprises the user pressing said activation button.

10. The device of claim 1 further adapted to be activated by the user by said user input interface and whereby the device presents itself to said NFC transfer device as an NFC tag only after the user has activated the device by using said user input interface.

11. The device of claim 1 further adapted to be permanently or semi-permanently fixed to an access device comprising said NFC transfer device.

12. The device of claim 11 further comprising an adhesive component for attaching the device to an access device comprising said NFC transfer device.

13. The device of claim 11 comprised in a protective shell or a protective cover of an access device comprising said NFC transfer device.

14. The device of claim 1 wherein said dynamic variable is based on external data and wherein the device is further adapted to receive said external data from said NFC transfer device by extracting the external data from second data contents of said NFC tag that have been updated by said NFC transfer device using NFC mechanisms for updating data contents of NFC tags.

15. The device of claim 14 further comprising a user output interface, wherein said external data comprises transaction data and wherein the device is further adapted to present said transaction data to the user and to capture with said input interface an approval or a rejection by said user of said presented transaction data and to generate said dynamic credential and/or to make said generated dynamic credential available to said NFC transfer device only if said user approved said presented transaction data.

16. The device of claim 15 wherein said user input interface comprises an approval button for capturing said approval and a rejection button for capturing said rejection.

17. The device of claim 15 further adapted to not present itself to said NFC transfer device as an NFC tag for a certain period after having received said external data from said NFC transfer device and to present itself again to said NFC transfer device only after said user approved or rejected said presented transaction data.

18. The device of claim 1 further adapted to:
receive a password value from said NFC transfer device by extracting said password value from third data contents of said NFC tag that have been updated by said NFC transfer device using NFC mechanisms for updating data contents of NFC tags;
verify the correctness of said received password value; and
generate said dynamic credential and/or make said generated dynamic credential available to said NFC transfer device only if the device has received said password value and has verified the correctness of said received password value.

19. A system for securing interaction of a user with a computer based application comprising:
an authentication device for generating a dynamic credential;
an application server for hosting a server part of said computer based application and verifying said dynamic credential generated by said authentication device; and
an access device for allowing said user to access said server part of said computer based application, the access device connected to the application server by a computer network and adapted to obtain said dynamic credential from said authentication device and to forward said obtained dynamic credential to said application server for verification;
whereby:
said access device comprises a Near-Field Communication (NFC) transfer device;
said authentication device comprises:
a memory component adapted to store a secret key;
a data processing component adapted to generate said dynamic credential by cryptographically combining said secret key with a first value of a first dynamic variable;
an NFC interface to couple the authentication device to said NFC transfer device; and
a user input interface configured to capture an input from said user
and whereby:
said authentication device is adapted to:
present itself to said NFC transfer device as an NFC tag; and
make said generated dynamic credential available to said NFC transfer device by including said dynamic credential in first data contents of said NFC tag that can be read by said NFC transfer device using NFC mechanisms for reading data contents of NFC tags; and
require a specific input from said user through the user input interface as a condition for at least one of said authentication device presenting itself to said NFC transfer device as an NFC tag or said data processing component generating said dynamic credential or said authentication device making said generated dynamic credential available to said NFC transfer device;
said access device obtains said dynamic credential by extracting the dynamic credential from said data contents of said NFC tag that the NFC transfer device reads using said NFC mechanisms for reading data contents of NFC tags;
said application server is adapted to receive said dynamic credential generated by said authentication device and obtained and forwarded by said access device; and to verify said received dynamic variable using a cryptographic algorithm with a second value of a second dynamic variable.

20. The system of claim 19 whereby said cryptographically combining said secret key with said first value of said first dynamic variable comprises performing a symmetric cryptographic algorithm on said first value of said first dynamic variable whereby said symmetric cryptographic algorithm is parameterized with said secret key and whereby said secret key is shared between said authentication device and said application server and whereby said application server uses a server copy of said secret key to verify said dynamic credential.

21. The system of claim 19 whereby
said authentication device and said access device share a binding secret;
said access device is further adapted to communicate to said authentication device a binding value derived from said binding secret by said NFC transfer device updating second data contents of said NFC tag using NFC mechanisms for updating data contents of NFC tags; and
said authentication device is further adapted to:
receive said binding value from said access device by extracting said binding value from said second data contents of said NFC tag that have been updated by said NFC transfer device using said NFC mechanisms for updating data contents of NFC tags;
verify said received binding value using said binding secret; and
generate said dynamic credential and/or make said generated dynamic credential available to said NFC transfer device only if the authentication device has successfully verified the correctness of said received binding value.

22. A method for securing interaction of a user with a computer based application comprising the steps of:
at an authentication device that comprises a user input interface configured to capture an input from said user and a Near-Field Communication (NFC) interface to couple the authentication device to an NFC transfer device generating a dynamic credential by cryptographically combining a first value of a first dynamic variable with a secret key that is stored in said authentication device and shared with an application server that is hosting a server part of said application; the authentication device presenting itself to said NFC transfer device as an NFC tag;
at the authentication device making said generated dynamic credential available to said NFC transfer device by including said dynamic credential in first data contents of said NFC tag that can be read by said NFC transfer device using NFC mechanisms for reading data contents of NFC tags, wherein the authentication device requires a specific input from said user through the user input interface as a condition for at least one of said authentication device presenting itself to said NFC transfer device as an NFC tag or said data processing component generating said dynamic credential or said authentication device making said generated dynamic credential available to said NFC transfer device;
allowing said user to access said computer based application using an access device that comprises said NFC transfer device and that is connected to the application server by a computer network;
at said access device obtaining said dynamic credential by extracting the dynamic credential from said data contents of said NFC tag that the NFC transfer device reads using said NFC mechanisms for reading data contents of NFC tags;
at said access device forwarding said dynamic credential to said application server;
at said application server receiving said dynamic credential that is generated by said authentication device and obtained by said access device; and
at said application server verifying said received dynamic credential.

* * * * *